United States Patent [19]

Klemetsen

[11] Patent Number: 5,476,279
[45] Date of Patent: Dec. 19, 1995

[54] TRAILER HITCH

[76] Inventor: Darrel Klemetsen, 10512 SE. 200th St., Kent, Wash. 98031

[21] Appl. No.: 163,903

[22] Filed: Dec. 6, 1993

[51] Int. Cl.$^6$ ................................ B60D 1/00; B60D 1/06
[52] U.S. Cl. .................................... 280/415.1; 280/416.1; 280/491.1; 280/491.5; 280/495; 280/504
[58] Field of Search ............................. 280/415.1, 416.1, 280/491.1, 491.2, 491.3, 491.5, 495, 500, 501, 504

[56] References Cited

U.S. PATENT DOCUMENTS 3,528,684  9/1970  Cowgill ............................... 280/491.5
4,022,490  5/1977  Rocksvold ........................... 280/416.1
4,482,167  11/1984  Haugrud ............................. 280/491.3

*Primary Examiner*—Mitchell J. Hill
*Attorney, Agent, or Firm*—Wells, St. John, Roberts, Gregory & Matkin

[57] ABSTRACT

A trailer hitch, including a structural frame member which receives a tow bar/hitch ball assembly, and includes a way to attach the structural member to a towing vehicle. The trailer hitch further provides a way to securely mount one or more tow bar assemblies, on, and in, the structural frame member.

10 Claims, 1 Drawing Sheet

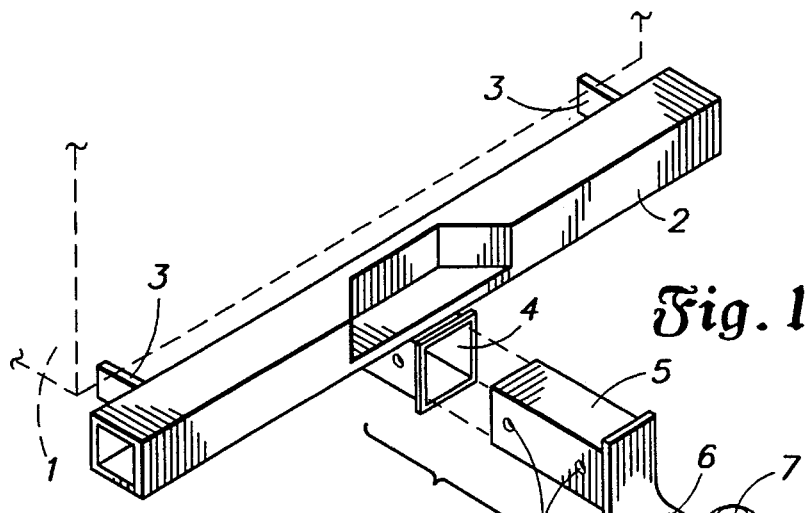
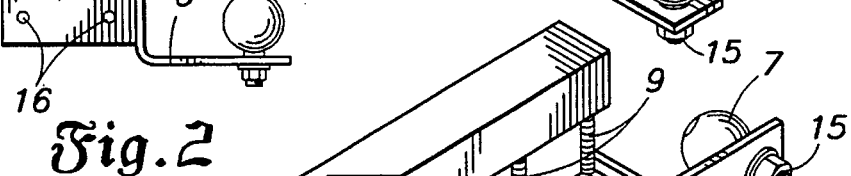
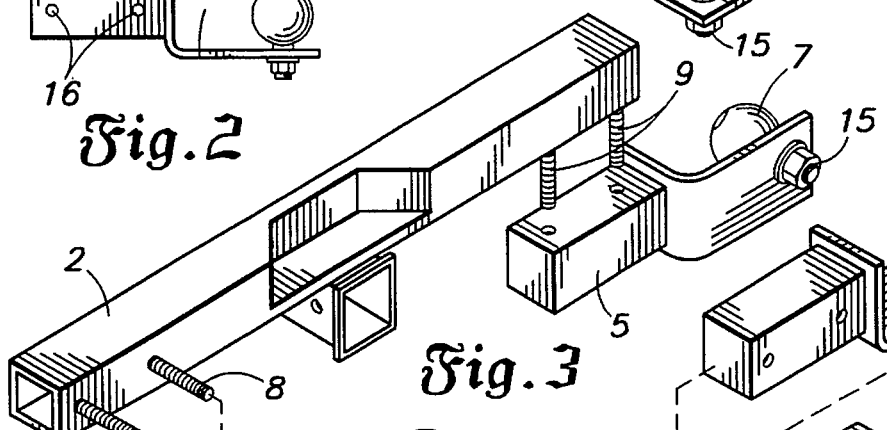
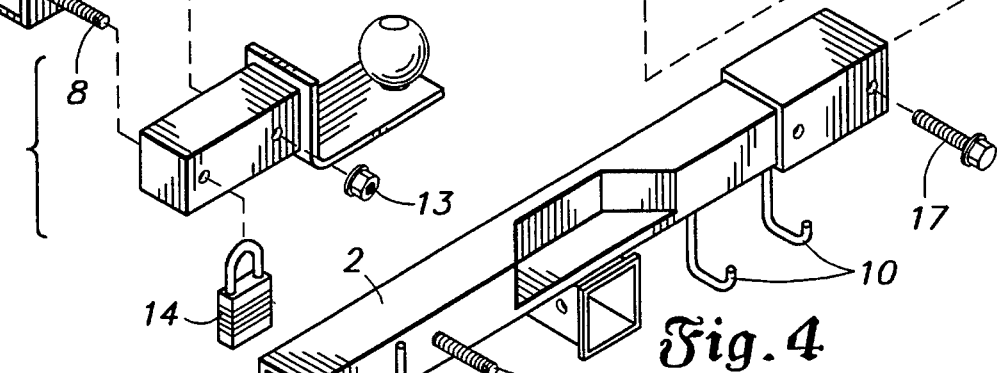
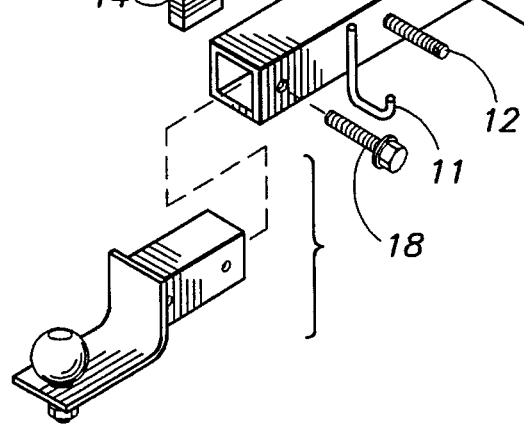

5,476,279

TRAILER HITCH

FIELD OF THE INVENTION

This invention generally pertains to trailer hitches which are attached to pickup trucks or other vehicles to allow the vehicle to alternatively be used as a towing vehicle.

BACKGROUND OF THE INVENTION

There are many different types of towing hitch apparatuses and configurations in use today which are attached to the back end of cars, trucks and other vehicles to allow the vehicle to be used to tow a multitude of different types of trailers.

In order to allow maneuverability of the vehicle and the trailer, and in order to avoid interference of the vehicle with the trailer, especially while making sharper turns, most hitches are designed such that the tow bar assembly part of the hitch, which includes the hitch ball, substantially protrudes from the rear of the vehicle. This leads to problems when the trailer is not hitched to the towing vehicle as it seems that most drivers get used to the natural length of the rear of their vehicles without the trailer, knowledge they rely on when maneuvering their vehicles in close quarters, such as backing up and parallel parking. This regularly leads to misjudgments in distance and ramming the tow bar and hitch ball into other vehicles and objects.

The ramifications of bumping into another vehicle or object with the tow bar/hitch ball assembly are substantial as the impact imparts a tremendous amount of energy on a small surface area. Since most people who use such hitch apparatuses are aware of the potential problem and how easy it is for that to happen, and in order to avoid inadvertently bumping into other vehicles with the tow bar/hitch ball assembly, most drivers remove the tow bar assembly from the hitch and store it in their trunk, in the back of their pickup or in the cab of their vehicle. However, tow bar/hitch ball assemblies stored in the open further seem to be the target of thieves and are frequently stolen when stored in a readily accessible location, such as in the open back of pickup trucks.

Trailer hitch balls by their very nature require greasing and become extremely dirty during normal use, and their storage in vehicles when not being used can be a very dirty and regretful situation. Drivers' hands and clothes easily become irreversibly stained and soiled, and the inside of the vehicle also becomes stained and soiled.

A solution to this long-standing problem is further complicated because there are many different types and sizes of hitch apparatuses and different types and sizes of tow bars and hitch balls.

My invention eliminates this problem that menaces so many people who use and remove these tow bar/hitch ball assemblies from their trailer hitches, by providing a means to mount and/or store the tow bar/hitch ball apparatuses on and in the hitch apparatus itself, so it does not have to be stored in the vehicle in some way.

My invention generally provides alternative solutions for alternative hitches and tow bar/hitch ball assemblies, by providing a unique mounting and/or storage means to secure, store and mount one or more tow bar/hitch ball assemblies on and in the structural frame means.

My invention solves the inherent problems discussed herein to an extent than industry has been unable to accomplish, despite a long-standing need for a solution.

SUMMARY OF THE INVENTION

My invention generally includes the typical elements of a trailer hitch assembly, namely a structural frame and a means to attach the structural frame to the towing vehicle. My invention, however, further includes a means to mount the tow bar assembly on, and store it within, the structural frame.

It is an object of this invention to provide an improved trailer hitch such that the user does not have to place the tow bar into the vehicle to remove it as an obstacle while driving without a tow, and to provide such a means on a relatively economic basis. My invention features storage both on, and in, the structural frame, and is relatively simple in design so that it can be inexpensively manufactured. Further, my invention will reduce or eliminate a person misplacing the tow ball or neglecting to retrieve it from storage when needed because it will always be conveniently attached to the tow bar assembly.

It is a further object of this invention to provide such an improved storage system for tow bar assemblies that can accommodate and securely store the differing types and configurations of tow bar assemblies. My invention has the feature of being able to receive different sized and configured tow bars such that the different types can be attached or stored in different ways on the same structural frame.

It is a further object of this invention to provide a readily accessible and handy means to store the tow bar assembly in the vicinity of where it is used, and to do so such that it is secure from theft. My invention has the advantage and feature that it provides the storage means on and in the structural frame itself and features a locking means to secure the tow bars from theft no matter where stored, whether on or in the structural frame.

My invention has the further feature that it allows the vehicle operator to store one or more extra tow bar assemblies in case of contingencies.

Other objects, features and advantages of this invention will appear from the specification, claims and accompanying drawings which form a part hereof. In carrying out the objects of this invention, it is to be understood that its essential features are susceptible to change in design and structural arrangement with only one preferred embodiment being illustrated in the accompanying drawings, as required.

BRIEF DESCRIPTION OF DRAWINGS

In the accompanying drawings which form a part hereof:

FIG. 1 is a perspective view of a typical towing vehicle, trailer hitch means, and tow bar assembly;

FIG. 2 is a plan view of a tow bar assembly, including a hitch ball;

FIG. 3 is a perspective view of one application of this invention, wherein two threaded screws are shown as a means to attach the tow bar assembly to the structural frame, one mounted facing the trailer and the other mounted on the underside of the structural frame; and FIG. 4 is a perspective view of another application of this invention, wherein multiple means of attaching the tow bar assembly to the structural frame of the trailer hitch apparatus are shown.

DESCRIPTION OF THE PREFERRED EMBODIMENT

This invention generally pertains to a trailer hitch assembly, namely a structural frame and a vehicle attachment assembly to attach the structural frame to the towing vehicle, but further includes a means to mount one or more tow bar assemblies on the structural frame for towing and a means to attach it the structural frame to store it on or within the structural frame, or both. This invention features different locations and means to store different sized and configured tow bar assemblies, thereby giving it the flexibility to be used for many different applications and tow bar configurations.

Many of the fastening, connection, welding, process and other means and components utilized in this invention are widely known and used in the field of the invention described, and their exact nature or type is not necessary for an understanding and use of the invention by a person skilled in the art or science, and they will not therefore be discussed in significant detail.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element may already be widely known or used in the art or by persons skilled in the art or science and each will not therefore be discussed in significant detail.

This invention generally includes the basic components of a trailer hitch, which are: a structural frame which receives a tow bar assembly recipient 4, a vehicle attachment assembly to attach the structural frame to the towing vehicle, and a tow bar assembly which is generally a tow bar and a hitch ball. There are many variations and different sizes and types of structural frame that can be utilized within the contemplation of this invention, and there are many different known means available to attach the structural frame to the towing vehicle which may be used.

The main feature of this invention is the means to store the tow bar assembly on and/or within, the structural frame, and there are several different means to accomplish this, and variations and combinations thereof.

FIG. 1 illustrates one application of the invention, and shows a typical towing vehicle 1, trailer hitch apparatus, and tow bar assembly, including the hitch ball 7 and a tubular support 5. The trailer hitch apparatus generally consists of a structural frame 2, a tow bar assembly recipient 4 and a vehicle attachment assembly 3 to attach the trailer hitch apparatus to the towing vehicle 1. A vehicle attachment assembly 3 to attach the structural frame to the vehicle is not shown in detail as these means are commonly known to those skilled in the art and a number of different variations and means can be used within the contemplation of this invention.

FIG. 1 illustrates how, for one or more applications, the tow bar assembly may be inserted and connected to the trailer hitch apparatus, by insertion of a tubular support 5 into a corresponding and slightly larger tow bar assembly 4 on the trailer hitch apparatus. As shown, one or more of the holes 16 in the tubular support 5 of the tow bar assembly can be used to secure the tow bar assembly in the towing position relative to the trailer hitch apparatus.

FIG. 2 shows one application of a typical tow bar assembly, including a hitch ball 7, a tow bar 6 and a tubular support 5 for attachment of the tow bar assembly to the trailer hitch apparatus. FIG. 2, illustrates one or more of the holes 16 in the tubular support 5 of the tow bar assembly, which can be used to secure the tow bar assembly in the towing position within the tow bar assembly recipient 4. The holes 16 in the tubular support 5 can also be used as part of a means to attach and/or lock the tow bar assembly to the trailer hitch apparatus in a storage position, as will be further discussed relative to other figures contained herein.

FIG. 3 shows one application of this invention, wherein two sets of threaded screws 8 & 9 are shown as a means to attach the tow bar assembly to the trailer hitch apparatus. A first set of threaded screws 8 is mounted facing the trailer and a second set of threaded screws 9 is mounted to the underside of the structural frame 2 of the trailer hitch apparatus. Further shown in FIG. 3 are holes in the tow bar assembly corresponding to the two threaded screws and through which threaded screws are extended.

FIG. 3 further shows how, in the storage position, the tow bar assembly can not only be attached to the trailer hitch assembly, but can also be locked thereto. The tow bar assembly can be mounted on the first set of threaded screws 8 such that the threaded screws 8 sufficiently penetrate through the holes in the tow bar assembly, that a bolt and/or other locking assembly can be secured through holes in the threaded screws 8.

One or more of the screws can have holes drilled through their penetrating end to allow the receipt of a cotter key or other locking assembly, to further secure the tow bar assemblies to the structural frame 2 of the trailer hitch assembly.

FIG. 3 also illustrates how hitch balls 7 are typically mounted on the tow bar 6. Typical hitch balls 7 are fixed to a threaded screw, which penetrates through the tow bar 6, and a bolt 15 is screwed thereon to secure it.

FIG. 4 shows another application of this invention where other means of attaching the tow bar assembly in a stored position to the structural frame 2 are shown. In one example shown in FIG. 4, two hanger brackets 10 are shown as a tow bar mount assembly to attach a tow bar assembly to the structural frame 2 of the trailer hitch apparatus. The two hanger brackets can be attached to the structural frame in any one of a number of known ways, such as bolting, welding, etc.

FIG. 4 further shows yet another application of this invention, wherein one hanger bracket 11 is combined with a threaded screw 12 to attach the tow bar assembly to the trailer hitch apparatus.

FIG. 4 illustrates yet another way to attach a tow bar assembly to the trailer hitch apparatus within the contemplation of this invention, wherein one end of the structural frame 2, is the recipient of the tubular support 5 of the tow bar assembly, which can then be secured in place by bolt 18 penetrating the structural frame 2. One or both of the ends of the structural frame can be either larger or smaller in cross-sectional area than the structural frame. The bolt can then be secured or locked in place in any number of known ways.

A further means to attach a tow bar assembly to the trailer hitch apparatus within the contemplation of this invention is shown in FIG. 4 wherein the structural frame 2 includes at one end a tube of a larger cross-sectional size to receive a tow bar assembly in which the tubular support 5 is of a larger size. The tow bar assembly can be attached and/or secured to the trailer hitch apparatus by bolt 17 penetrating the structural frame 2, which can then be locked in any number of known ways.

The invention as disclosed in its numerous combinations is also uniquely capable of receiving a large variety of tow bar assemblies which are different sizes and configurations and further provides for the simultaneous storage of multiple tow bar assemblies, as is described herein and as illustrated in the drawings.

The structural frame 2 of the trailer hitch apparatus can be constructed of tubular shaped material, either square or rectangular, and its ends can then receive tow bar assemblies. In order to accommodate tow bar assemblies of different sizes, an additional tubular member of a different size can be affixed to one end of the structural frame, of sufficient length to receive the desired tow bar assembly, as illustrated in FIG. 4 and described more fully herein.

There are a number of known ways to secure and/or lock the tow bar assemblies which are attached within the ends of the structural frame 2, such as by using corresponding holes in the structural frame and the tow bar assembly 16 such that a threaded screw, such as shown as items 17 or 18, can be inserted therein from the inside or from the outside. A bolt can then secure the tow bar assembly within the structural frame 2. Further, a hole can be made in the end of the threaded screw, and the hole can then receive a locking means of some sort, such as a cotter key or other known locking assemblies such as a key lock or a padlock.

While the preferred embodiment for the invention has been described in detail, those familiar with the art to which this invention relates will recognize various alternative designs and embodiments for carrying out the invention, as defined by the claims which follow.

I claim:

1. A trailer hitch for attachment to a towing vehicle and to which a tow bar assembly can secured in a position to tow, the tow bar assembly including a tubular support and a hitch ball, wherein the trailer hitch comprises:

a. a structural frame with a first end which is tubular and open and a second end, and which has a tow bar assembly recipient between the first end and the second end;

wherein the first end of the structural frame is sized and shaped to receive and store a tow bar assembly.

2. A trailer hitch as recited in claim 1, and which further comprises a means to secure the tow bar assembly to the structural frame means when the tubular support means of the tow bar assembly is within the open tubular end of the structural frame means.

3. A trailer hitch as recited in claim 1, and in which the structural frame means has a first tubular end and a second tubular end, wherein the second tubular end is a different size than the first tubular end and may receive a differently sized tubular support means of a tow bar assembly than the first tubular end may receive.

4. A trailer hitch as recited in claim 1, and which is further comprised of:

a. a plurality of screws attached to the structural frame means; and b. in which the tubular support means of the tow bar assembly includes a plurality of holes corresponding to the plurality of screws attached to the structural frame means, such that the tubular support means of the tow bar assembly can be mounted on the structural frame means by inserting the plurality of screws through the plurality of holes in the tubular support means.

5. A trailer hitch as recited in claim 4, and which is further comprised of a means to secure the tow bar assembly to the structural frame means when the tubular support means of the tow bar assembly is mounted on the structural frame means.

6. A trailer hitch as recited in claim 1, and which is further comprised of a plurality of hangar brackets attached to the structural frame means and which is sized and configured such that the tow bar assembly can be placed and stored therein.

7. A trailer hitch as recited in claim 6, and which is further comprised of a means to attach the tow bar assembly to the structural frame when the tubular support of the tow bar assembly is placed and stored in the hangar brackets.

8. A trailer hitch as recited in claim 1, and which is further comprised of a means to secure the tow bar assembly to the structural frame means when the tubular support means of the tow bar assembly is placed into and stored within the hangar brackets.

9. A trailer hitch as recited in claim 1, and which is further comprised of:

a. a screw attached to the structural frame means and in which the tubular support means of the tow bar assembly includes a hole; and b. a hangar bracket; and which is configured such that the tubular support means of the tow bar assembly can be mounted onto the structural frame means by inserting the screw through the hole in the tubular support means and the tow bar assembly can be further secured by the structural frame means by also placing it into the hangar bracket.

10. A trailer hitch as recited in claim 1, and which is further comprised of a tow bar assembly which includes a tubular support means which inserts in and is attachable to the tubular support recipient of the structural frame means, a tow bar means connected to the tubular support means and a hitch ball attached to the tow bar means.

* * * * *